United States Patent [19]

Oldfather

[11] Patent Number: 5,412,586

[45] Date of Patent: May 2, 1995

[54] METHOD AND SYSTEM FOR INTERFACING A COMPUTER PROCESSOR WITH A CALCULATOR KEYBOARD AND CALCULATOR

[75] Inventor: William R. Oldfather, St. Louis, Mo.

[73] Assignee: Sharp Kabushiki Kaisha, Osaka, Japan

[21] Appl. No.: 24,073

[22] Filed: Mar. 1, 1993

[51] Int. Cl.⁶ .............................................. G06F 3/02
[52] U.S. Cl. ............................. 364/709.12; 364/709.1
[58] Field of Search ..................... 364/709.12, 709.14, 364/709.1, 709.01

[56] References Cited

U.S. PATENT DOCUMENTS

| | | | |
|---|---|---|---|
| 4,894,522 | 1/1990 | Elliott | 364/709.11 |
| 4,964,075 | 10/1990 | Shaver et al. | 364/709.12 |
| 5,251,163 | 10/1993 | Rouhani | 364/709.12 |
| 5,278,958 | 1/1994 | Dewa | 364/709.12 |

*Primary Examiner*—David H. Malzahn

[57] ABSTRACT

A system is provided for interfacing a calculator type keyboard with an external computer processor so that key depressions on the calculator type keyboard will communicate and be processed by the external computer processor. In addition, a system is provided in which a calculator keyboard and a calculator processor are disconnected and separately operated by an external computer processor. The calculator keyboard and the calculator processor are separated by a calculator keyboard/PC redirect circuit so that all keystrokes on the keyboard of the calculator are diverted to the external computer processor for processing. Thereby, number processing similar to word processing can be performed by the external computer processor with accurate and fast input performed on the calculator keyboard.

11 Claims, 8 Drawing Sheets

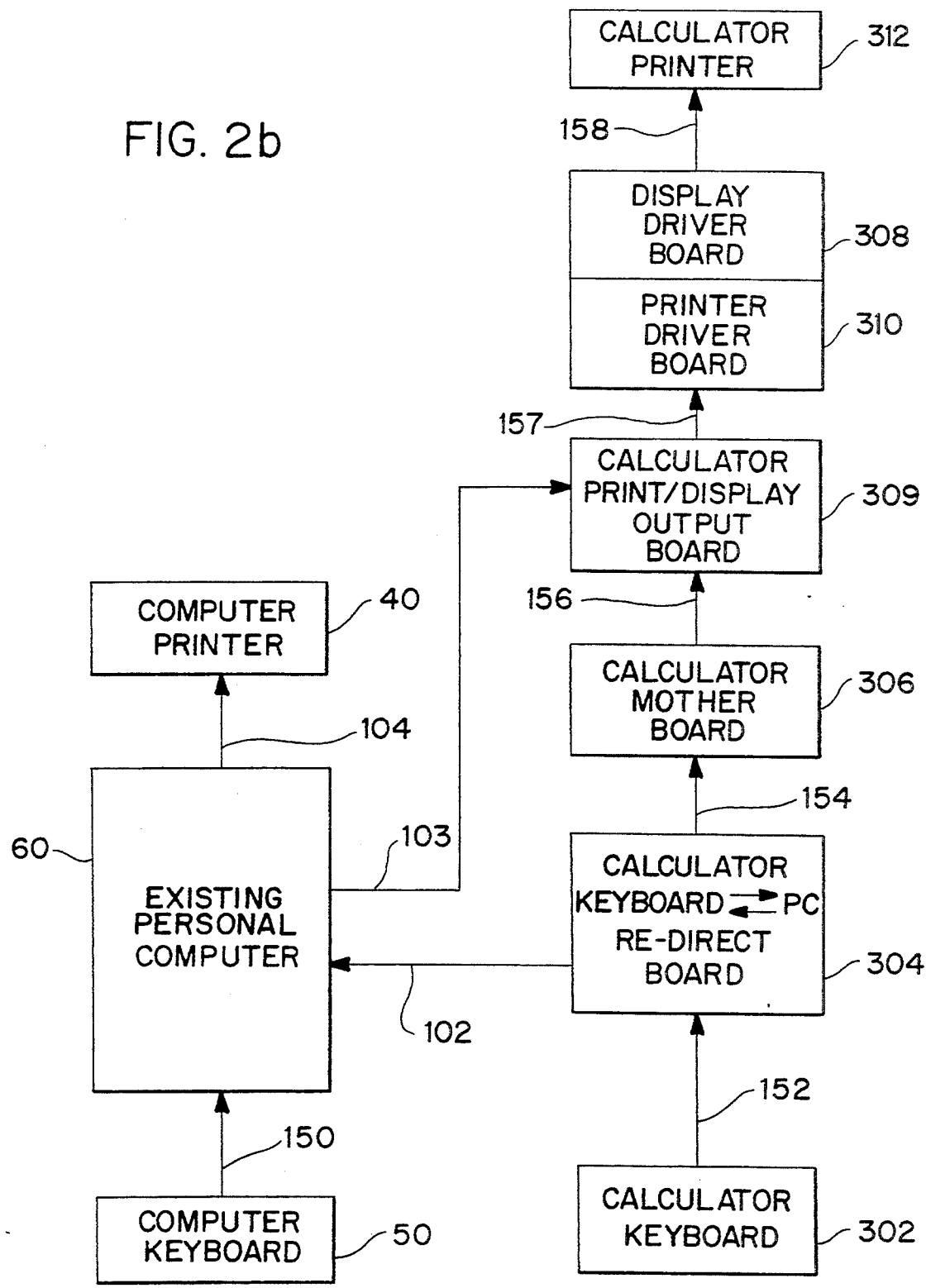

METHOD AND SYSTEM FOR INTERFACING A COMPUTER PROCESSOR WITH A CALCULATOR KEYBOARD AND CALCULATOR

BACKGROUND OF THE INVENTION

1. Field of the Invention

The present invention is directed to interfacing a calculator keyboard with an external computer processor, and also interfacing a calculator with an external computer processor so that the keypads and the processor of the calculator operate independently by the control of the external computer processor.

2. Description of the Related Art

One example of the many calculator programs is a Windows ® type of software program which provides a calculator program for a DOS operating system of a personal computer. However, such calculator programs are not widely used and in particular, the Windows ® type of calculator program is not widely used because a mouse driven operator interface is used which requires the operator to physically move the mouse across the screen to the image of the key that they wish to depress and then click the mouse button to register the key depression.

Although the keyboard of the personal computer could be used to input some of the calculator keys, some of the keys critical to business operations such as MEMORY +, MEMORY −, MEMORY TOTAL, MEMORY SUBTOTAL, MEMORY CLEAR, CLEAR ENTRY, TOTAL, SUBTOTAL, BACKSPACE, GRAND TOTAL, PERCENT, PERCENT+, PERCENT−, EQUAL, EQUALS+, EQUALS−, NON ADD, CHANGE SIGN (+/−), ØØ, ØØØ, CONSTANT, ITEM COUNT, SQUARE, SQUARE ROOT, PERCENT INCREASE AND PERCENT DECREASE keys, for example, are not included on PC keyboards. Therefore, the Windows ® type of calculator program provides the display of some additional keys on the screen of the personal computer for access by the mouse. Furthermore, other feature keys such as ADD MODE, CONSTANTS and ITEM COUNT are missing from the screen of the Windows ® type of calculator program. In addition, existing keys such as BACKSPACE, MULTIPLY and DIVIDE are provided on the screen of the Windows ® Calculator Program such that they are either totally out of touch position or they are not labeled in a recognizable form.

Another known program similar to the Windows ® type of calculator program is a Nortons Utilities type of program which has a screen based calculator program imbedded within its many applications. Even though this program has a paper tape audit trail for making corrections, a mouse is still mandatory for many operations and the operator is required to continually jump back and forth between the keyboard and the mouse to activate key images on the screen that do not have actual equivalent keys on the keyboard. Another conventional program is a Sidekick type of program which operates as a terminate and stay resident program. The Sidekick type of program has the same operating difficulties as in the other PC screen based programs along with a lack of features for business users.

Presently, even though many types of keyboards have been connected to a personal computer, a calculator type keyboard has not been interfaced with a personal computer so that the personal computer can be used for number processing the entries from the calculator type keyboard. Furthermore, the keyboard of calculators do not have auto repeat on all keys, in contrast to personal computer keyboards, which have auto repeat on all keys and thereby causes double entries. Also, calculator keyboards have manual function repeat (keys must be released before the next key is accepted) in contrast to personal computers where operational functions will repeat automatically or manually if the key is held too long and calculator keyboards take advantage of key rollover features without causing double entries from automatic repeat (on PC keyboards) which increases the accuracy when using a calculator keyboard.

In a calculator keyboard, function keys are within easy reach of the ten key section. In contrast, on personal computers, function keys are arranged similar to a typewriter at various positions on the keyboard or certain function keys are required to be operated by a mouse causing two-handed PC calculator operation which causes a failure of the operator to maintain hand position on the input document as a guide to the next input line and constant hand movement between the keyboard and the mouse. Therefore, the present invention is directed to interfacing a calculator keyboard and a calculator with a personal computer which increases the number processing capabilities by reducing eye, hand and arm movement.

In addition, there are several known types of keypads which may be connected to a personal computer for providing an additional keypad layout. However, the additional keypad layout may not necessarily provide additional calculator functions. For example, a generic number pad such as the Launching Pad by Genovation, Inc. provides a keypad for portable computers. However, the Launching Pad and other generic number pads do not provide additional calculator functions as such generic number pads only provide some calculator conventional key functions already provided on standard personal computer keyboards without providing additional calculator functions. Also, a separate keyboard calculator is known such as a keyboard calculator having keypads similar to the keys provided on the Key pro FX 9000 by Focus Electronic Co., Ltd. for example. However, only the standard keypad functions are sent for processing by the personal computer and the additional calculator functions provided on the Key pro type of keypad are not processed and sent to the personal computer. Furthermore, an on-line keypad, such as an ABACUS type of keypad by Key Tronic for example, is known which can do a one time sending of a calculated result when connected to a personal computer. However, the ABACUS type of line keypad cannot send calculator functions to the personal computer which are not already provided on the personal computer.

SUMMARY OF THE INVENTION

An object of the present invention is to interface a calculator type keyboard to an external computer processor for processing a plurality of calculator functions in excess of standard computer key functions.

Another object of the present invention is to disconnect the keyboard of a calculator from the calculator processor so that the calculator keyboard and the calculator processor operate independently by the control of an external computer processor.

The objects of the present invention are fulfilled by providing a system for interfacing a calculator keyboard including a plurality of calculator function keys in excess of standard computer keys with an external processing device comprising connecting means for connecting the calculator keyboard to the external processing device and interfacing means connected to the external processing device for converting actual keystrokes including the plurality of calculator function keys in excess of standard computer keys from the calculator keyboard signals to processor signals so that the processor signals are processed by the external processing device.

More particularly, standard computer keys comprise numeric, plus, minus, backslash, asterisk, enter num lock and decimal keys and the plurality of calculator function keys comprise MEMORY +, MEMORY −, MEMORY TOTAL, MEMORY SUBTOTAL, MEMORY CLEAR, CLEAR ENTRY, TOTAL, SUBTOTAL, BACKSPACE, GRAND TOTAL, PERCENT, PERCENT+, PERCENT−, EQUAL, EQUALS+, EQUALS−, NON ADD, CHANGE SIGN (+/−), ØØ, ØØØCONSTANT, ITEM COUNT, SQUARE, SQUARE ROOT, PERCENT INCREASE AND PERCENT DECREASE keys. The interfacing means comprises a key signal translator for converting the actual keystrokes from the calculator keyboard signals to the processor signals and a number processor for processing the processor signals converted by the key signal translator.

Another embodiment of the present invention is fulfilled by providing a system for interfacing a calculator including a plurality of calculator function keys in excess of standard computer keys with an external processing device comprising connecting means for connecting the calculator to the external processing device, switching means connected to the calculator for disconnecting the keyboard of the calculator from the processor of the calculator and interfacing means connected to the external processing device for sending a disconnect signal from the external processing device to the switching means so that the switching means disconnects the keyboard from the processor of the calculator and the external processing device separately controls the keyboard and the processor of the calculator.

More particularly, the interfacing means comprises a key signal translator for converting actual keystrokes including the plurality of calculator function keys in excess of standard computer keys from the keyboard of the calculator to processor signals, a number processor for processing the processor signals converted by the key signal translator and a key depression simulator for converting the processor keyboard signals processed by the number processor into simulated keystroke signals and inputting the simulated keystroke signals to the processor of the calculator to simulate keystroke depressions from the keyboard of the calculator and display means for displaying said simulated keystroke signals processed by the processor of the calculator.

A further object of the present invention is filled by providing a method for interfacing a calculator keyboard including a plurality of calculator function keys in excess of standard computer keys with an external processing device comprising the steps of connecting the calculator keyboard to the external processing device, converting actual keystrokes from the calculator keyboard to processor signals and processing the processor signals converted by the external processing device.

A still further object of the present invention is fulfilled by providing a method for interfacing a calculator including a plurality of calculator function keys in excess of standard computer keys with an external processing device comprising the steps of connecting the calculator to the external processing device, disconnecting the keyboard of the calculator from the processor of the calculator in response to a disconnect signal generated by the external processing device and separately controlling the keyboard and the processor of the calculator by the external processing device.

More particularly, the keyboard and the processor of the calculator are separately controlled by the external processing device by the further steps of converting the actual keystrokes from the keyboard of the calculator to processor signals, processing the converted processor signals, converting the processed processor signals into simulated keystroke signals, inputting the simulated keystroke signals to the calculator to simulate keystroke depressions on the keyboard of the calculator and displaying the simulated keystroke signals.

A further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE DRAWINGS

The present invention will become more fully understood from the detailed description given hereinbelow and the accompanying drawings which are given by way of illustration only, and thus are not limitative of the present invention and wherein:

FIGS. 2a and 2b illustrate two methods of a calculator to PC bi-directional interface for further embodiments of the present invention;

DETAILED DESCRIPTION OF THE PREFERRED EMBODIMENTS OF THE PRESENT INVENTION

Figure 1:
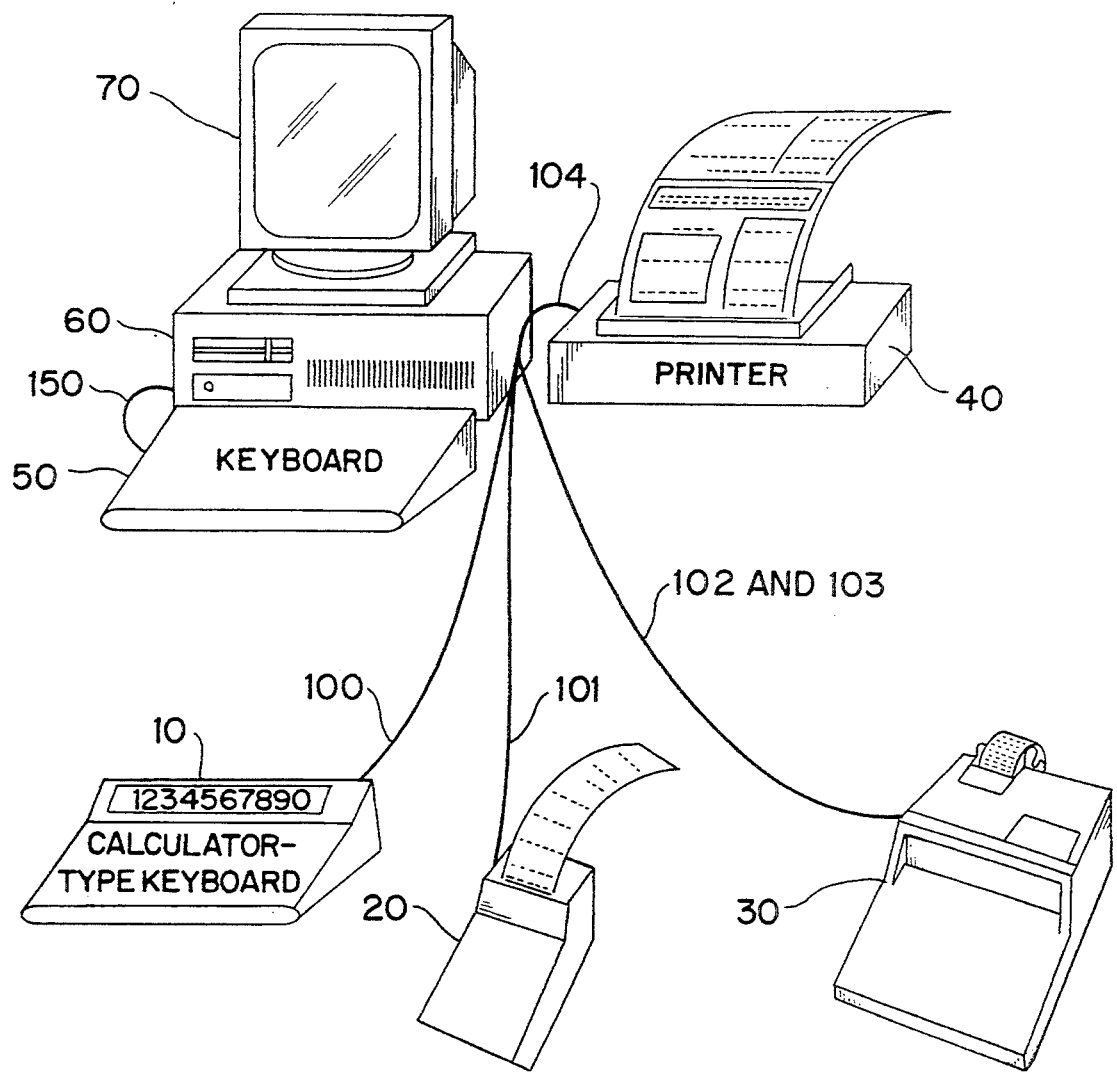
FIG. 1 illustrates a configuration of the system for an embodiment of the present invention.

A first embodiment of the present invention will be described with reference to FIG. 1. FIG. 1 illustrates a calculator keyboard 10 connected to a computer processor 60 by a cord or a wireless communication 100. The computer processor 60 includes a keyboard 50 for entering data thereto, a display 70 and a printer 40.

The calculator type keyboard 10 is a typical calculator keyboard including some standard keys such as NUMERIC, PLUS, MINUS, DECIMAL in addition to calculator functions such as MEMORY+, MEMO- RY−, MEMORY TOTAL, MEMORY SUBTOTAL, MEMORY CLEAR, CLEAR ENTRY, TOTAL, SUBTOTAL, TOTAL, PERCENT, PERCENT+, PERCENT−, EQUAL, EQUAL+, EQUAL−, NON ADD, CHANGE SIGN (+/−), 00, 000, CONSTANT, ITEM COUNT, PERCENT INCREASE, PERCENT DECREASE, SQUARE, AND SQUARE ROOT. The calculator keyboard 10 interfaces with the computer processor 60 by an interfacing program such as Sharp's Keyboard Signal Translator Program and a number processing program such as the HyperCalc Number Processing Program from EBS Software. Sharp's Keyboard Signal Translator Program and the HyperCalc Number Processing Program are examples of a number of interfacing and number processing programs that could be written to interface the keyboard calculator 10 with the computer processor 60 so that calculator keystrokes are processed by the computer processor 60. The HyperCalc Number Processing Program performs all of the functions that a typical word processing program performs on words but the HyperCalc Number Processing Program performs these functions on numbers. The HyperCalc Number Processing Program is primarily operated from the calculator type keyboard 10 for convenience, accuracy and speed. However, a mouse or the processor keyboard 50 may also be used to operate the Hypercalc Number Processing Program.

The HyperCalc Number Processing Program emulates a "Windows®" operating environment, which shows multiple tapes (documents) on the processor display 70.

Some of the more basic features of the Hypercalc Number Processing Program are as follows: complete editing (error correction with insert and typeover correction to data input/to function performed/to alpha label of data, insertion capability for one line and multiple lines, deletion capability for one line and multiple lines, cut/copy/paste and clearing of data, function and labels); complete filing (save, recall, delete, save desktop and recall desktop); windowing tape display (up to 16 tapes at one time, zoom, cascade, tile, next, previous, close, close all); tape control (clone, delete, compare, tear, label, Post-it note, solve, what if, transposition check and zeros check); and applications (program supplied, end-user created and software developer created).

Figure 3:
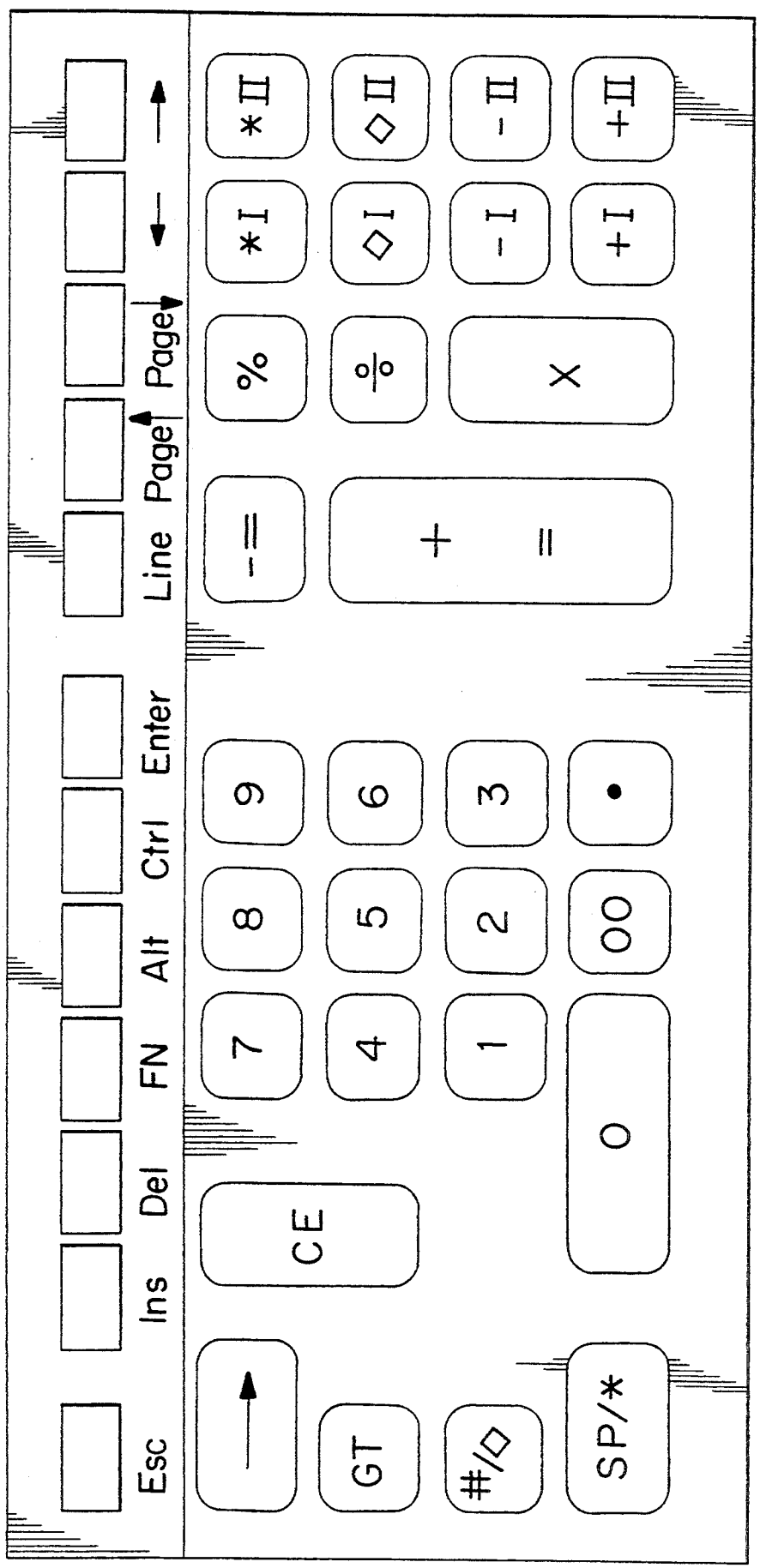
FIG. 3 illustrates the configuration of a calculator keyboard for an embodiment of the present invention.

The calculator type keyboard 10 and the HyperCalc Number Processing Program operate similarly to any standard calculator, in addition to providing all of the features as described in the paragraph above. An example of the keypads for a calculator type keyboard 10 is illustrated in FIG. 3.

Another embodiment of the present invention will be described with reference to FIGS. 1 and 2a. FIG. 1 further illustrates a standard calculator 30 connected to the computer processor 60 by wireless communication cords 102 and 103. The standard calculator 30 used may be any conventional calculator. For example, a standard printing calculator such as a Sharp CS2850 Calculator may be used. In connecting the standard calculator 30 directly to the computer processor 60, for interfacing the standard calculator 30 with the computer processor 60 in an on-line mode, all of the keystrokes from the keyboard of the standard calculator 30 are essentially diverted to the computer processor 60 and the keystrokes from the keyboard of the standard calculator 30 are not allowed to pass through to the calculator processor from the calculator keyboard except when it is necessary to print information back on the calculator tape. In an off-line mode, all normal calculator functions of the standard calculator 30 are retained.

Figure 2A:
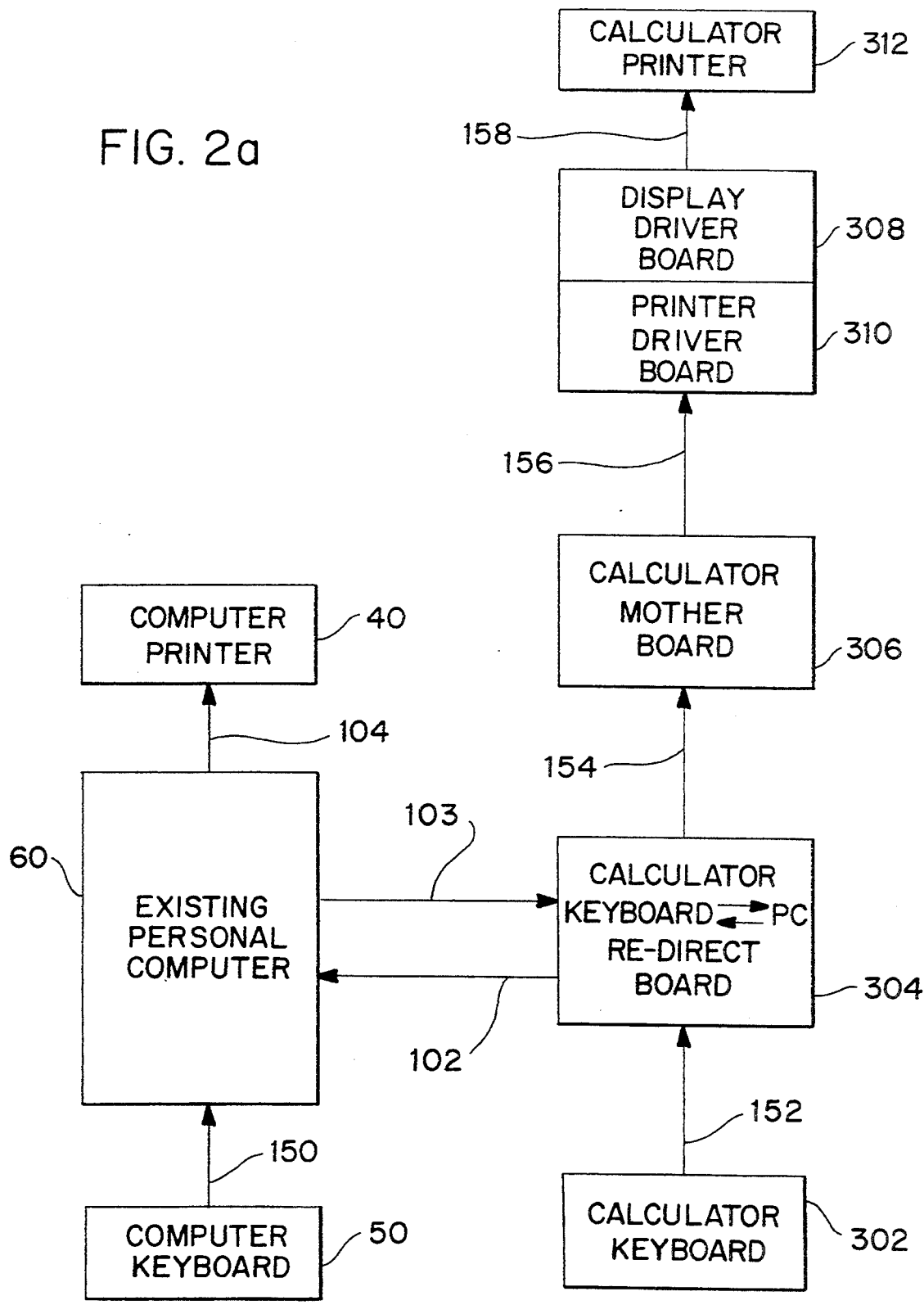

An example of a configuration for diverting the keystrokes from the keyboard of the standard calculator 30 to the computer processor 60 is illustrated in FIG. 2a. The standard calculator 30 includes a calculator keyboard 302 connected to a calculator keyboard/PC redirect circuit 304 by a cable 152, a calculator mother board 306 connected to the calculator keyboard/PC redirect circuit 304 by a cable 154, a printer driver board 310 and a display driver board 308 connected to the calculator mother board 306 by a cable 156 and a calculator printer 312 connected to the display driver board 308 by a cable 158. The printer 40 is connected to the computer processor 60 by a cable 104 and the keyboard 50 is connected to the computer processor 60 by a cable 150.

Another example of a configuration for diverting the keystrokes from the keyboard of the standard calculator 30 to the computer processor 60 is illustrated in FIG. 2b. Again, the standard calculator 30 includes the calculator keyboard 302 connected to the calculator keyboard/PC redirect circuit 304 by the cable 152, the calculator mother board 306 connected to the calculator keyboard/PC redirect circuit 304 by the cable 154, a calculator print/display output board 309 connected to the calculator mother board 306 by a cable 156 and the calculator print/display output board 309 is also connected to the computer processor 60 by the cable 103, the printer driver board 310 and the display driver board 308 connected to the calculator print/display output board 309 by a cable 157 and a calculator printer 312 connected to the display driver board 308 by the cable 158. The difference between the calculator to computer processor by directional interface illustrated in FIG. 2b from the interface illustrated in FIG. 2a is that the cable 103 in FIG. 2b is connected to the calculator print/display output board 309 and not to the calculator keyboard/PC redirect board 304.

Figure 4:
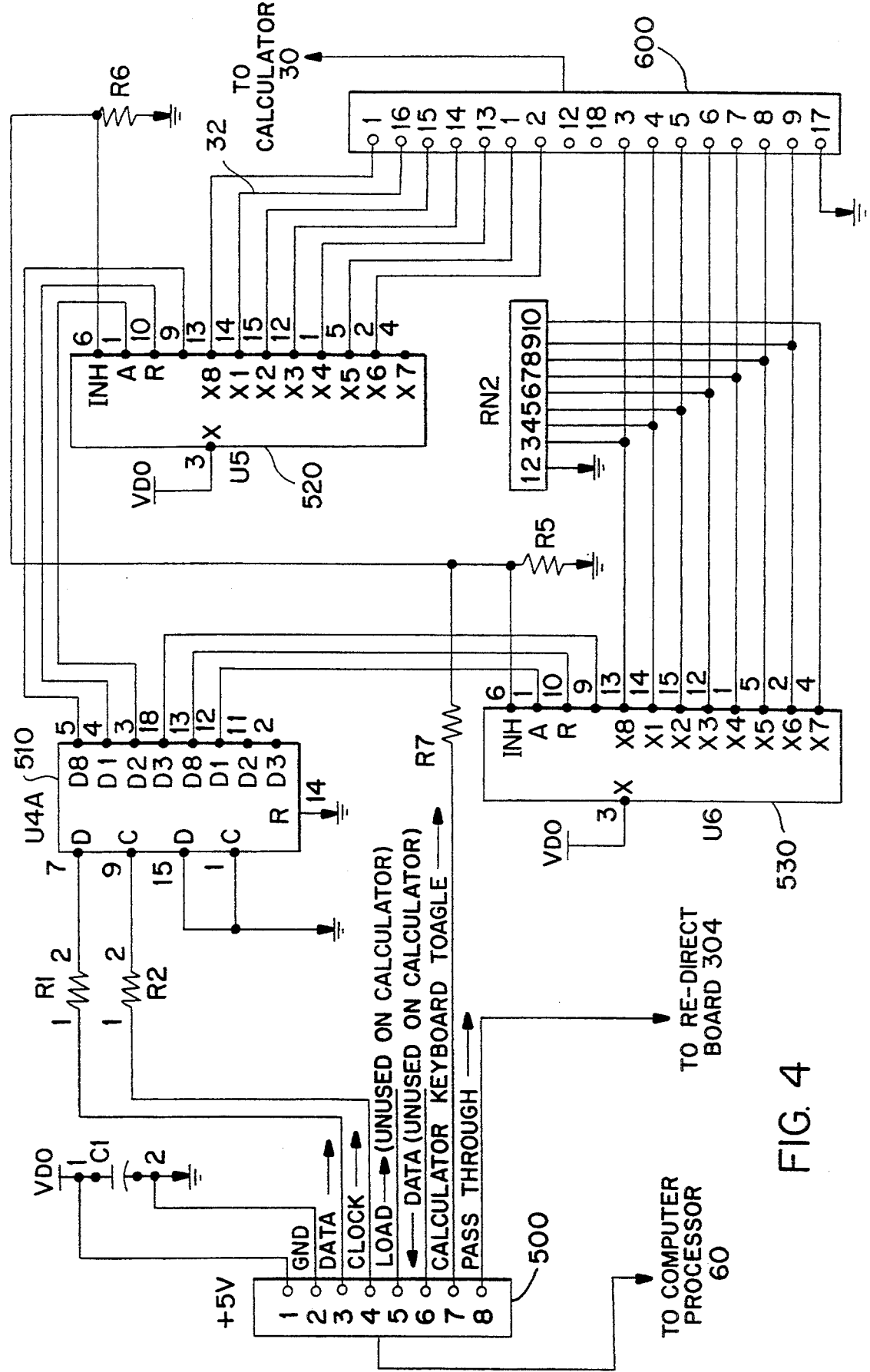
FIG. 4 illustrates a schematic diagram for a calculator keyboard to PC interface for another embodiment of the present invention.
Figure 5:
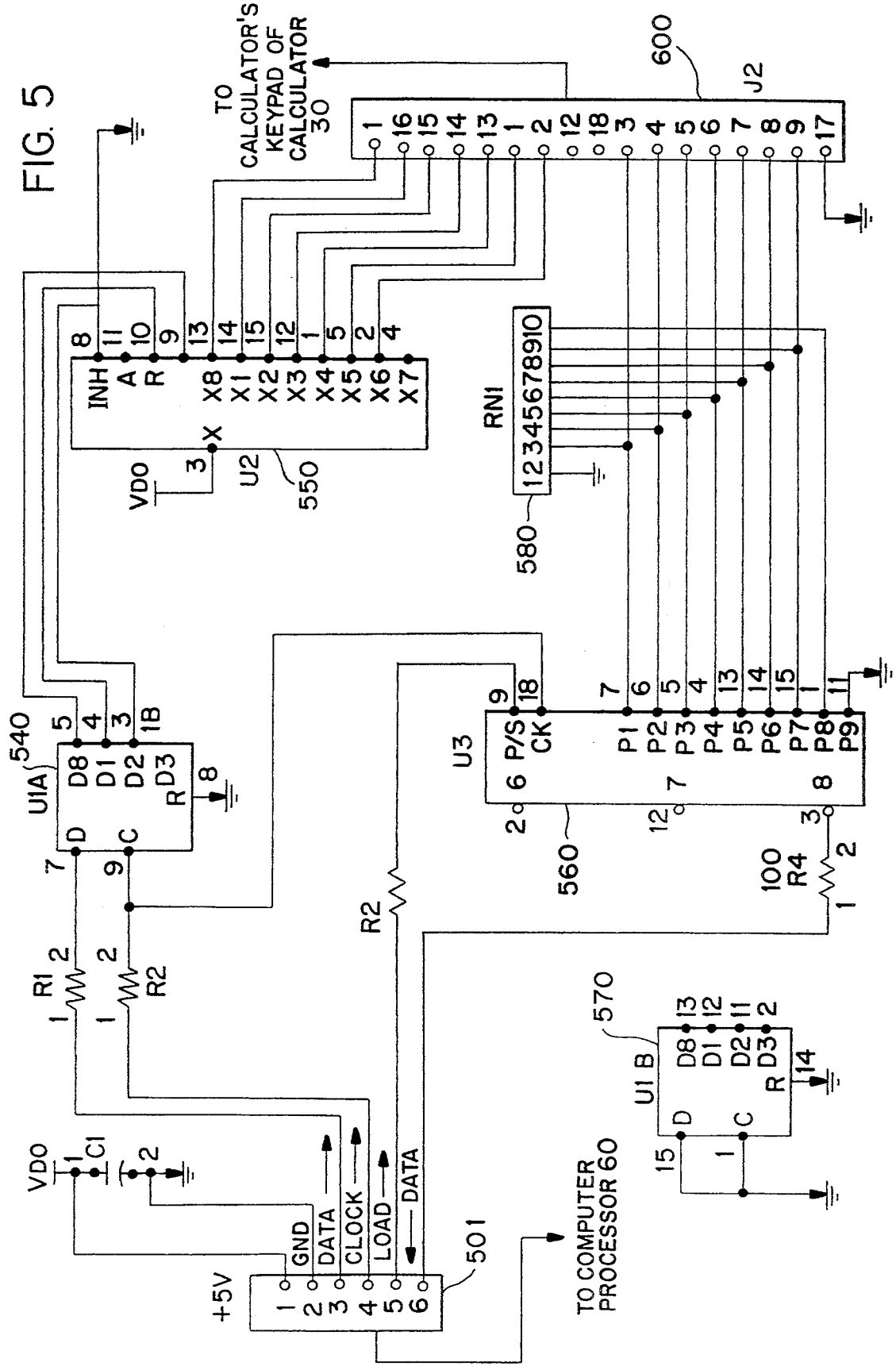
FIG. 5 illustrates the configuration for a calculator to PC bidirectional interface for another embodiment of the present invention.

FIG. 4 illustrates the configuration of the keypads of the standard calculator 30 and FIG. 5 illustrates the configuration of the calculator. In FIG. 4, the keyboard for the calculator 30 includes a connector 500 to the computer processor 60, a serial/parallel circuit for reading serial data from the computer processor 60 and converting the serial data to 2–3 bit parallel lines and sending parallel data, a first selector 520 for selecting one of eight rows to be activated on the keypad of the calculator 30, a second selector 530 for selecting one of eight columns to be activated on the keyboard of the calculator 30 and a calculator connector 600 for connecting to the calculator 30.

As illustrated in FIG. 5, the calculator includes a connector 501 for connecting to the computer processor 60, a serial/parallel circuit 540 for reading rows to be activated from the computer processor 60, converting serial to parallel and setting rows to be activated, an activator 550 for activating 1 of 8 selectable rows, a data reading circuit 560 for reading parallel scanned data of columns for selected rows and returning parallel data to the computer processor 60 as serial data and a circuit 570 for grounding unused keypads. The keyboard of the standard calculator 30 has any conventional layout of keypads and an example of a conventional layout is illustrated in FIG. 3.

The present embodiment of this system redirects calculator keyboard inputs from the standard calculator 30 to the computer processor 60 and then translates these signals into standard PC keyboard signals by using a keyboard signal translator such as Sharp's Keyboard Signal Translator Program so that the calculator keyboard signals can be understood by a number processing program such as the HyperCalc Program. The output signals from the keyboard signal translator program can be defined by the operator so that any key can output any signal required for a specific program. The output from the Hypercalc Program may be directed to either the printer 40 connected to the computer processor 60 as illustrated in FIG. 1 or back to the printer of the standard calculator 30 (if the standard calculator 30 includes printing capabilities) by having the computer processor 60 send emulated key depressions back to the standard calculator 30. The system may additionally include an alpha/numeric tape printer 20 connected to the computer processor 60 by a cord or wireless communication 101 as illustrated in FIG. 1 for printing information. As a result of the configuration of this system, the standard calculator 30 operates as if someone is pushing the keys on the calculator keyboard and that the functions are being performed by an operator indexing numbers and pressing keys on the standard calculator 30.

Figure 6:
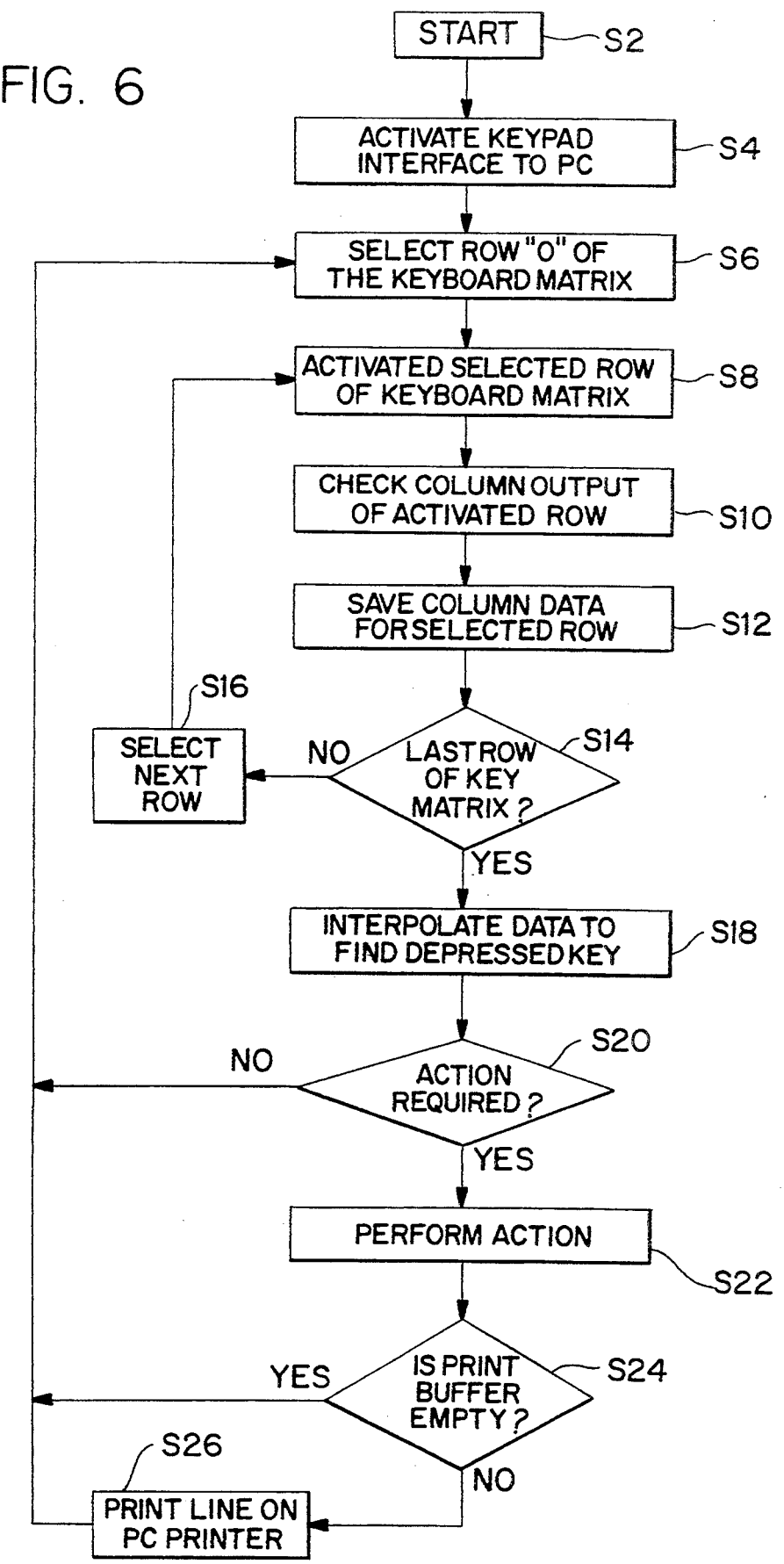
FIG. 6 illustrates a flowchart for the operation of the calculator keypad to PC interface.

A description of the logical flowchart for the standard calculator 30 and the calculator type keyboard 10 will be discussed with reference to FIGS. 6 and 7.

When the standard calculator 30 is connected to the computer processor 60, the calculator keyboard/PC redirect circuit 304 of the calculator 30 allows the computer processor 60 to completely disconnect the keyboard of the calculator 30 from the processor of the calculator 30. The calculator 30 then becomes two independent devices of a keyboard and a calculator without a keyboard. When the redirect circuit 304 is activated from the computer processor 60, the bus lines 152 and 154 between the calculator keyboard 302 and the calculator mother board 306 are disconnected and the calculator keyboard 302 and the calculator mother board 306 are disconnected and separately controlled to the computer processor 60. From this point on, the computer processor 60 controls everything that the calculator 30 is doing and all of the information that is entered on the calculator keyboard 302 goes directly to the computer processor 60 so that the calculator keyboard 302 and the calculator mother board 306 are completely unrelated devices.

Figure 7:
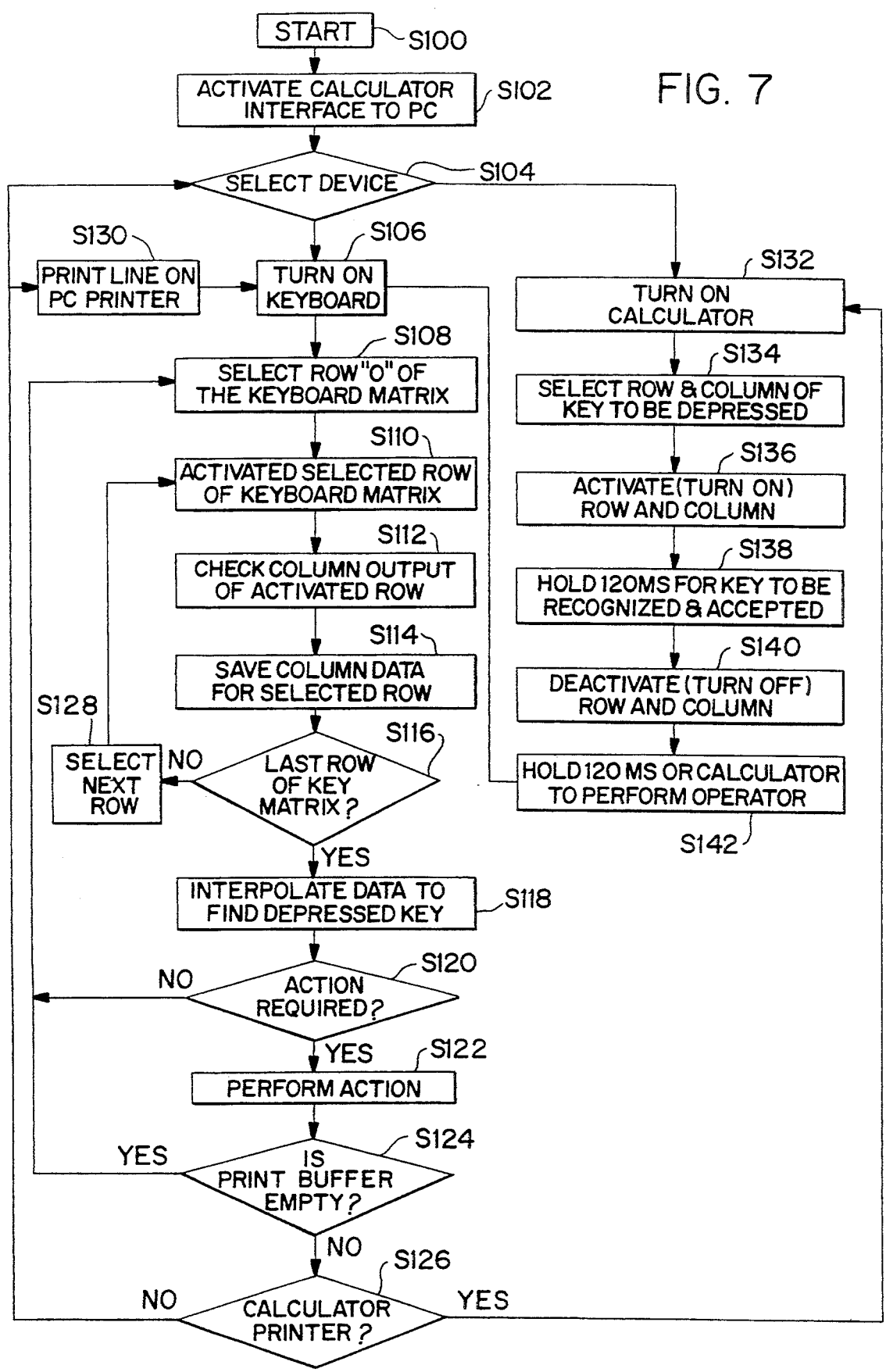
FIG. 7 illustrates a logic flowchart for a keypad calculator to PC bidirectional interface.

Next, at step S104 in FIG. 7, the computer processor selects where information is being received from and sent to. Either the computer processor 60 is going to send information to the calculator 30 for possibly doing calculations or printing information on the calculator 30 from steps S132 to S142, receive information via the calculator keyboard 302 at step S106 or send information to the printer 40 associated with the personal computer 60 at step S130.

For explanation purposes, it is assumed that the device selected at step S104 is the keyboard and the keyboard is turned on at step S106. At step S108, the computer processor 60 selects the first row (row 0) of the keyboard matrix for the calculator keyboard 302. Because keyboards are generally made up of rows and columns, when a key of the keyboard is depressed, a certain row and a certain column is connected. By monitoring the output from the columns as each row is activated, the particular key depressed can be determined. Because this determination is done extremely fast and done many times per second, the operator is generally unaware of this monitoring. After the first row (row 0) of the keyboard matrix is selected at Step S108, step S110 activates or turns on the power of the selected row in the keyboard matrix. At Step S112, if a key is depressed, one of the column outputs will become active with the same signal that was sent to one of the rows. The computer processor 60 reads all of the columns output and all of the columns in which there is no signal become a binary 0 and the columns which have a signal become a binary 1. As a result, a binary number is received and in the present example, an 8-bit binary number is received because there are eight rows and eight columns. Accordingly, when all eight rows and columns are read, an 8-bit binary number is received where one of the columns has a signal which will be called a "1" for description purposes.

Next, the 8-bit binary number is stored on a chip in the redirect circuit 304 and sent back to the computer processor 60 as a key depression. The computer processor 60 then checks to see if this signal is the last row of the particular scan at Step S116. Generally, a signal is sent down each row and the activated column output after each row is checked to determine which key is being held down. Because the monitoring is done so fast, an operator cannot depress a key without the computer processor 60 actually sensing the depression even though the rows are being sensed in sequence. If the last row is not selected, the next row is selected at Step S128 and the process continues to loop through Steps S110 to S116 until each of the rows of the keyboard matrix have been scanned.

After the last row is reached, the information that is received from all of the column outputs is interpreted at Step S118. This interpretation determines the particular key that is pressed and whether or not it is a true and legitimate key depression and not just an accidental bounce in the electronics. By debouncing software, it may be insured that the intended key has been pressed and the key has not been accidentally depressed to receive two or three signals so that only legitimate key depressions are received by eliminating debouncing from the interpreted data.

At Step S120, a determination of an action that is required at that moment in time is determined. If no action is required, which means that no key was depressed, the process loops back to Step S108 for going through the scanning process again. However, if an action is necessary, the action is performed at Step S122. At Step 124, it is determined whether the print buffer is empty. If the print buffer is empty and nothing needs to be printed, the process loops back to Step S108 and continues to scan the keyboard for another key depression. If there is information in the print buffer, the process proceeds to Step S126.

At Step S126, it is determined whether the printer of the calculator 30 or the printer 40 for the computer processor 60 should be used. For this discussion, it is assumed that the information is sent to the printer of the calculator 30 and a signal activates the redirect circuit 304 of the calculator at Step S132. When the calculator is activated, the calculator keyboard 302 is automatically turned off since more than one function cannot be performed at the same time so that an operator will not accidentally index information on the keyboard that would be missed while the computer processor 60 is sending information to the calculator 30.

After the calculator is turned on at Step 132, the calculator 30 is essentially doing what a person would do if the calculator 30 were being operated by hand. The computer processor 60 simulates the depression of keys on the calculator 30 as if an operator were depressing keys. By selecting one of the eight rows and one of the eight columns in the keyboard matrix and electrically closing a switch, an actual key depression is simulated at Step S134. As a result, the row and column of the actual key depression is activated which in turn sends the calculator 30 a signal that a key has been depressed at Step S136. The signal remains for a sufficient amount of time for the calculator 30 to recognize that an actual key has been depressed (about 120 milliseconds) at Step S138. After that time, a deactivation is sent to turn off the row and column which will also be held for a sufficient amount of time for the calculator to recognize (about 120 milliseconds) at Steps S140 and S142. After Step S142, the processor returns to Step S106 for turning the calculator keyboard 302 back on and starting the scanning sequence for further key depressions.

This sequence continually cycles so that the computer processor 60 continually scans the keyboard 302 to see if keys are being depressed. If keys are being depressed, the computer processor 60 initiates the action required. Between each action, the computer processor 60 checks to determine if anything is to be printed on either the printer 40 or the printer of the calculator 30. If information is to be printed, one line on either the calculator or the computer processor 60 is printed and the process then goes back to scanning the calculator keyboard 302. On the next pass through, if there are still no key depressions, the next line will be printed and this process will continue. Each succeeding line will be printed in between keyboard scans. By this method, both the printer 40 and the printer of the calculator 30 may be used intermittently while the computer processor 60 is continually scanning the keyboard 302 for key depressions.

The process for turning on the keyboard will be discussed with reference to Steps S106–S130 in FIG. 7, but it is noted that Steps S4–S24 in FIG. 6 correspond to the same steps when a calculator type keyboard 10 is interfaced to the computer processor 60 instead of the calculator 30.

The actions required are key depressions that are sent to the computer processor 60 for processing by a processing program such as the HyperCalc Program. The required actions are performed in conjunction with the HyperCalc Program for displaying electronic tapes on the display 70 of the computer processor 60.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A system for interfacing a calculator with a processing device external to the calculator, the calculator including a plurality of calculator function keys in excess of standard computer keys associated with the processing device, comprising:

connecting means for connecting the calculator to the processing device;

switching means connected to the calculator for disconnecting a keyboard of the calculator from a processor of the calculator; and interfacing means connected to the processing device via the connecting means for transmitting a disconnect signal sent from the processing device to said switching means so that said switching means disconnects said keyboard of the calculator from said processor of the calculator for allowing the processing device to separately control said keyboard of the calculator and said processor of the calculator.

2. The system according to claim 1, wherein:

said interfacing means includes, a key signal translator for converting actual keystrokes including the plurality of calculator function keys in excess of standard computer keys from said keyboard of the calculator to translated signals, a number processor for processing said translated signals converted by said key signal translator, and a key depression simulator for converting said translated signals processed by said number processor into simulated keystroke signals and inputting said simulated keystroke signals to said processor of the calculator to simulate keystroke depressions from said keyboard of the calculator; and there is further provided display means for displaying said simulated keystroke signals processed by said processor of the calculator.

3. The system according to claim 2, wherein the calculator comprises a printing calculator for printing said simulated keystroke signals.

4. The system according to claim 2, further including switching means comprises a diverter circuit connected between said keyboard of the calculator and said processor of the calculator for diverting said processor signals to the processing device and sending said simulated keystroke signals from the processing device to said processor of the calculator.

5. The system according to claim 1 wherein said calculator function keys are capable of initiating calculator functions distinct from and in addition to calculator functions which can be initiated by the standard computer keys associated with the processing device.

6. A method for interfacing a calculator with a processing device external to the calculator, the calculator including a plurality of calculator function keys in excess of standard computer keys associated with the processing device, comprising the steps of:

(a) connecting the calculator to the processing device;

(b) disconnecting a keyboard of the calculator from a processor of the calculator in response to a disconnect signal generated by the processing device; and (c) separately controlling said keyboard of the calculator and said processor of the calculator by the processing device after disconnecting at said step (b).

7. The method according to claim 6, further comprises the steps of:

(1) converting actual keystrokes from said keyboard of the calculator to processor signals;

(2) processing said processor signals converted at said step (1);

(3) converting said processor signals processed at said step (2) into simulated keystroke signals;

(4) inputting said simulated keystroke signals to said processor of the calculator to simulate keystroke depressions on said keyboard of the calculator; and (5) displaying said simulated keystroke signals.

8. The method according to claim 7, wherein said step (5) displays said simulated keystroke signals by printing on a printer associated with the calculator.

9. The method according to claim 7, wherein said step (5) displays said simulated keystroke signals by printing on a printer associated with the external processing device.

10. The method according to claim 7, further comprising the steps of diverting said processor signals to the processing device and sending said simulated keystroke signals from the processing device to said processor of the calculator.

11. The method according to claim 6 wherein said calculator function keys are capable of initiating calculator functions distinct from and in addition to calculator functions which can be initiated by the standard computer keys associated with the processing device.

* * * * *

UNITED STATES PATENT AND TRADEMARK OFFICE
CERTIFICATE OF CORRECTION

PATENT NO. : 5,412,586
DATED : May 2, 1995
INVENTOR(S) : William R. Oldfather

It is certified that error appears in the above-indentified patent and that said Letters Patent is hereby corrected as shown below:

On the cover page, under "Assignee:" add:

--and Sharp Electronics Corporation, Mahwah, New Jersey--after

"Sharp Kabushiki Kaisha, Osaka, Japan"

Signed and Sealed this

Twenty-seventh Day of February, 1996

Attest:

BRUCE LEHMAN

*Attesting Officer*     *Commissioner of Patents and Trademarks*